(12) United States Patent
Yamamoto et al.

(10) Patent No.: US 9,219,564 B2
(45) Date of Patent: *Dec. 22, 2015

(54) WIRELESS TERMINAL APPARATUS AND WIRELESS BASE STATION APPARATUS

(71) Applicant: KDDI CORPORATION, Tokyo (JP)

(72) Inventors: Toshiaki Yamamoto, Fujimino (JP); Feng Lu, Fujimino (JP); Toshinori Suzuki, Fujimino (JP)

(73) Assignee: KDDI CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/166,307

(22) Filed: Jan. 28, 2014

(65) Prior Publication Data

US 2014/0140191 A1     May 22, 2014

Related U.S. Application Data

(62) Division of application No. 12/447,209, filed as application No. PCT/JP2007/071246 on Oct. 31, 2007, now Pat. No. 8,761,145.

(30) Foreign Application Priority Data

Oct. 31, 2006  (JP) .................................. 2006-296910

(51) Int. Cl.
    *H04J 13/00*     (2011.01)
    *H04J 13/18*     (2011.01)
    (Continued)

(52) U.S. Cl.
    CPC ............ *H04J 13/0003* (2013.01); *H04J 11/00* (2013.01); *H04J 13/004* (2013.01);
    (Continued)

(58) Field of Classification Search
    None
    See application file for complete search history.

(56) References Cited

U.S. PATENT DOCUMENTS 6,804,307 B1    10/2004 Popovic
2007/0165567 A1   7/2007 Tan et al.
(Continued)

FOREIGN PATENT DOCUMENTS

JP      07-336323 A     12/1995
JP      8-288927 A      11/1996
(Continued)

OTHER PUBLICATIONS

Author Unknown, Multiplexing of L1/L2 Control Signaling when UE has no Data to Transmit, Nokia Submission R1-062841, Third Generation Partnership Project, Oct. 13, 2006, pp. 1-7.*

(Continued)

*Primary Examiner* — Christopher Crutchfield

(74) *Attorney, Agent, or Firm* — Morgan, Lewis & Bockius LLP

(57) ABSTRACT

Both a wireless terminal apparatus and wireless base station apparatus are provided that can, in an operation of encoding the control signals of the upstream link transmitted from the multiple terminal stations while encoding with regard to each of the terminal stations, increase a number of the terminal stations to which different codes are respectively assigned. A wireless terminal apparatus includes: an encoding information receiving portion receiving encoding information which is used at the wireless terminal apparatus from the base station; a phase-shifting unit which conducts a phase-shifting operation on a predetermined first code based on the encoding information; a code selection unit which, based on the received encoding information, selects a second code from multiple codes orthogonally crossing each other; and a control signal encoding portion which conducts an encoding operation on the control signal that is going to be transmitted to the base station by using both the first code on which the phase-shifting operation has been conducted and the second code.

1 Claim, 4 Drawing Sheets

(51) Int. Cl.
 *H04J 11/00* (2006.01)
 *H04W 72/04* (2009.01)
 *H04L 5/00* (2006.01)
 *H04W 76/04* (2009.01)
 *H04W 88/02* (2009.01)

(52) U.S. Cl.
 CPC ........ *H04J 13/0059* (2013.01); *H04J 13/0062* (2013.01); *H04J 13/0074* (2013.01); *H04J 13/18* (2013.01); *H04L 5/0014* (2013.01); *H04W 72/0413* (2013.01); *H04W 76/04* (2013.01); *H04W 88/02* (2013.01)

(56) References Cited

U.S. PATENT DOCUMENTS

| 2008/0075060 | A1 | 3/2008 | Tiirola et al. | |
|---|---|---|---|---|
| 2009/0227261 | A1* | 9/2009 | Tiirola et al. | 455/450 |

FOREIGN PATENT DOCUMENTS

| JP | 08-288927 | A | 11/1996 |
|---|---|---|---|
| JP | 2007-194751 | A | 8/2007 |
| JP | 2007-300314 | A | 11/2007 |
| JP | 2008/136156 | A | 6/2008 |
| JP | 2009-540665 | A | 11/2009 |
| WO | 2007/142492 | A2 | 12/2007 |
| WO | 2008/041675 | A1 | 4/2008 |

OTHER PUBLICATIONS

Author Unknown, CDM-Based Multiplexing Method of Multiple ACK/NACK and CQI for E-UTRA Uplink, Third Generation Partnership Project Document R1-062742, Oct. 9, 2006, pp. 1-6.*

A. Dammann, S. Kaiser, Low Complex Standard Conformable Antenna Diversity Techniques for OFDM Systems and its Application to the DVB-T System, 4th International ITG Conference on Source and Channel Coding, Berlin, Germany, 2002.*

Office Action dated Aug. 1, 2014, issued by the U.S. Patent and Trademark Office in U.S. Appl. No. 14/166,237.

Author Unknown, EUTRA SC-FDMA Uplink Pilot/Reference Signal Design & TP, Third Generation Partnership Project Document R1-061176, May 12, 2006, pp. 1-8.

Author Unknown, Composition of Proposed Uplink Pilot Structures for SC-OFDMA, Third Generation Partnership Project Document R1-060373, Feb. 13, 2006, pp. 1-10.

PCT Search Report, PCT/JP2007/071246, 2007.

NTT DoCoMo, Ericsson, Fujitsu, Mitsubishi Electric, Sharp, Toshiba Corp., 3GPP TSG RAN WG1 Meeting #46bis, R1-062742, "CDM-based Multiplexing Method of Multiple ACK/NACK and CQI for E-UTRA Uplink," Oct. 2006; pp. 1-6.

Kiddi, NTT DoComo, "L1/L2 Control Channel Structure with CDM Based Multiplexing in Downlink," 3GPP TSG RAN WG1 Meeting #46bis; R1-062805; Oct. 2006; pp. 1-4.

Kiddi, NTT DoComo, "Scrambling Code for L1/L2 Control Channel with CDM Based Multiplexing in E-UTRA Downlink," 3GPP TSG RAN WG1 Meeting #46bis; R1-062945; Oct. 2006; pp. 1-4.

Office Action dated Jul. 2, 2015, issued by the U.S. Patent & Trademark Office in U.S. Appl. No. 14/166,279.

Notice of Allowance issued on May 18, 2015, issued by the U.S. Patent & Trademark Office in U.S. Appl. No. 14/166,300.

Popovic, "Generalized Chirp-Like Polyphase Sequence with Optimum Correlation Properties," IEEE Transactions on Information Theory, vol. 38, No. 4, Jul. 1992, pp. 1406-1409.

* cited by examiner

FIG. 5

| | | 1 | 2 | 3 | 4 | 5 | 6 | 7 | 8 | 9 | 10 | 11 | 12 |
|---|---|---|---|---|---|---|---|---|---|---|---|---|---|
| | | \multicolumn{12}{c}{CONTROL SIGNAL AREA (12 BITS)} |

| UE1 | CAZAC Δ1 | CAZAC Δ1 | CAZAC Δ1 | CAZAC Δ1 | . . . . . . . . . . . . . | CAZAC Δ1 | CAZAC Δ1 | CAZAC Δ1 | CAZAC Δ1 |
|---|---|---|---|---|---|---|---|---|---|
| | Walsh 1 | 1 | 1 | 1 | . . . . . . . . . . . . | Walsh 1 | 1 | 1 | 1 |

| UE2 | CAZAC Δ1 | CAZAC Δ1 | CAZAC Δ1 | CAZAC Δ1 | . . . . . . . . . . . . . | CAZAC Δ1 | CAZAC Δ1 | CAZAC Δ1 | CAZAC Δ1 |
|---|---|---|---|---|---|---|---|---|---|
| | Walsh 1 | −1 | 1 | −1 | . . . . . . . . . . . . | Walsh 1 | −1 | 1 | −1 |

| UE3 | CAZAC Δ1 | CAZAC Δ1 | CAZAC Δ1 | CAZAC Δ1 | . . . . . . . . . . . . . | CAZAC Δ1 | CAZAC Δ1 | CAZAC Δ1 | CAZAC Δ1 |
|---|---|---|---|---|---|---|---|---|---|
| | Walsh 1 | 1 | −1 | −1 | . . . . . . . . . . . . | Walsh 1 | 1 | −1 | −1 |

| UE4 | CAZAC Δ1 | CAZAC Δ1 | CAZAC Δ1 | CAZAC Δ1 | . . . . . . . . . . . . . | CAZAC Δ1 | CAZAC Δ1 | CAZAC Δ1 | CAZAC Δ1 |
|---|---|---|---|---|---|---|---|---|---|
| | Walsh 1 | −1 | −1 | 1 | . . . . . . . . . . . . | Walsh 1 | −1 | −1 | 1 |

FIG. 6

| | | 1 | 2 | 3 | 4 | 5 | 6 | 7 | 8 | 9 | 10 | 11 | 12 |
|---|---|---|---|---|---|---|---|---|---|---|---|---|---|
| UE1 | | CAZAC Δ1 | CAZAC Δ1 | . | . | . | . | . | . | . | . | CAZAC Δ1 | CAZAC Δ1 |
| | | Walsh 1 | | Walsh 1 | . | . | . | . | . | . | Walsh 1 | | Walsh 1 |
| UE2 | | CAZAC Δ1 | CAZAC Δ1 | . | . | . | . | . | . | . | . | CAZAC Δ1 | CAZAC Δ1 |
| | | Walsh 1 | | Walsh −1 | . | . | . | . | . | . | Walsh 1 | | Walsh −1 |
| UE3 | | CAZAC Δ2 | CAZAC Δ2 | . | . | . | . | . | . | . | . | CAZAC Δ2 | CAZAC Δ2 |
| | | Walsh 1 | | Walsh 1 | . | . | . | . | . | . | Walsh 1 | | Walsh 1 |
| UE4 | | CAZAC Δ2 | CAZAC Δ2 | . | . | . | . | . | . | . | . | CAZAC Δ2 | CAZAC Δ2 |
| | | Walsh 1 | | Walsh −1 | . | . | . | . | . | . | Walsh 1 | | Walsh −1 |

CONTROL SIGNAL AREA (12 BITS)

WIRELESS TERMINAL APPARATUS AND WIRELESS BASE STATION APPARATUS

This application is a divisional of U.S. patent application Ser. No. 12/447,209, filed on Apr. 24, 2009, which claims the benefit of the Japanese Patent Application No. 2006-296910, filed on Oct. 31, 2006, the entire disclosure of each of which is incorporated herein by reference.

TECHNICAL FIELD

The present invention relates to a wireless terminal apparatus and a wireless base station apparatus.

BACKGROUND ART

In recent years, a standardization project "3GPP: 3rd Generation Partnership Project" has been discussing a standard regulation of a third generation (3G) mobile communication system. One of topics which has been discussed is a control signal transmission method of an upstream link (link in a direction from a terminal station to a base station).

For example, Non-Patent Document 1 proposes a method of encoding both ACK/NACK signals transmitted from multiple terminal stations and CQI (Channel Quality Indicator) signals at the upstream link with regard to each of the terminal stations. ACK/NACK signals are response signals of 1 bit for confirmation of transmission, ACK signal has a bit "1" used when responding positively, and NACK signal is a bit "0" used when responding negatively. CQI signal is a signal of 5 bits that reports a receiving level.

In a technique of Non-Patent Document 1, ACK/NACK signals and CQI signals are encoded by using "CAZAC (Constant Amplitude Zero Auto Correlation)" code. In this conventional technique, the phase shift amount of CAZAC code used for encoding is varied with regard to each of the terminals. It should be noted that the CAZAC code is a code that has constant amplitude and no autocorrelation.

However, the above-described conventional technique assigns CAZAC code of the different phase shift amount to each of the terminals, but has a problem in which a number of the terminal stations to which the code can be assigned is small.

[Non-Patent Document 1] 3GPP, R1-062742, NTT DoCoMo et al., "CDM-based Multiplexing Method of Multiple ACKJNACK and CQI for E-UTRA Uplink", Oct. 9-13, 2006

DISCLOSURE OF INVENTION

The present invention was conceived in order to solve the above-described problem and has an object to provide both a wireless terminal apparatus and wireless base station apparatus that can, in an operation of encoding the control signals of the upstream link transmitted from the multiple terminal stations while encoding with regard to each of the terminal stations, increase a number of the terminal stations to which different codes are respectively assigned.

In order to solve the above-described problems, the present invention provides, for example, following aspects.

A first aspect is a wireless terminal apparatus which encodes and transmits a control signal to a wireless base station, including: an encoding information receiving unit receiving encoding information which is used at the wireless terminal apparatus from the base station; a first phase-shifting unit which conducts a phase-shifting operation on a predetermined first code based on the encoding information; a code selection unit which, based on the encoding information, selects a second code from multiple codes orthogonally crossing each other; an encoding unit which conducts an encoding operation on the control signal by using both the first code on which the phase-shifting operation has been conducted and the second code; and a transmission unit which transmits the encoded control signal.

A second aspect is a wireless base station apparatus which communicates with the above-described wireless terminal apparatus, including: an encoding information transmission unit transmitting the encoding information which is respectively different with regard to the wireless terminal apparatus; a receiving unit the encoded control signal from the wireless terminal apparatus; a second phase-shifting unit which conducts a phase-shifting operation on the first code based on the encoding information corresponding to the wireless terminal apparatus; a second code selection unit which, based on the encoding information corresponding to the wireless terminal apparatus, selects the second code from multiple codes orthogonally crossing each other; and a decoding unit which decodes the encoded control signal by using both the first code on which the phase-shifting operation has been conducted and the second code.

A third aspect is the above-described wireless terminal apparatus, wherein the first code has both a constant amplitude and a zero autocorrelation.

A fourth aspect is a control signal transmission method of a wireless terminal apparatus including steps of: based on predetermined encoding information, conducting a phase-shifting operation on a first code which has both a constant amplitude and a zero autocorrelation; based on the encoding information, selecting a second code from multiple codes orthogonally crossing each other; conducting an encoding operation on the control signal by using both the first code on which the phase-shifting operation has been conducted and the second code; and transmitting the encoded control signal.

In accordance with the above-described first, second and fourth aspects, in an operation of encoding the control signals of the upstream link transmitted from the multiple terminal stations while encoding with regard to each of the terminal stations, it is possible to increase a number of the terminal stations to which different codes are respectively assigned. In addition, in accordance with the above-described third aspect, it is possible to use CAZAC that is generally known.

BRIEF DESCRIPTION OF THE DRAWINGS

FIG. 5 is a drawing for explaining Example 2 in which a first code and a second code of the present invention are used.

FIG. 6 is a drawing for explaining Example 3 in which a first code and a second code of the present invention are used.

DESCRIPTION OF THE REFERENCE SYMBOLS

Figure 1:
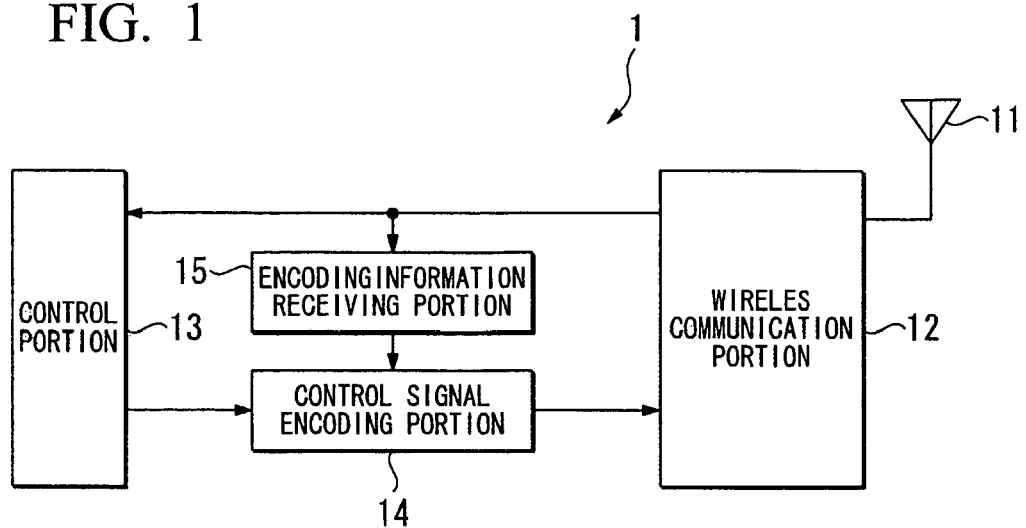
FIG. 1 is a block diagram showing a constitution of a terminal station (wireless terminal apparatus) 1 of one embodiment of the present invention.

1 . . . terminal station (wireless terminal apparatus)
11, 41 . . . antenna
12, 42 . . . wireless communication portion 13, 43 ... control portion
14 ... control signal encoding portion
15 ... encoding information receiving portion
21 ... phase shift portion
22 ... code generation portion
23, 24 ... multiplier
40 ... base station (wireless base station)
44 ... control signal decoding portion
45 ... encoding information transmission portion

BEST MODE FOR CARRYING OUT THE INVENTION

Hereinafter, in reference to the drawings, a preferable embodiment of the present invention as an example is explained. It should be noted that the following embodiments are not limitations on the present invention, and for example, it is possible to add, remove or replace the constitutional elements, and in addition, it is possible to combine the constitutional elements.

In reference to the drawings, one embodiment of the present invention is explained below.

FIG. 1 is a block diagram showing a constitution of a terminal station (wireless terminal apparatus) 1 of this embodiment of the present invention. The terminal station 1 is a terminal station of a mobile communication system and conducts a wireless communication with a base station explained below. In FIG. 1, the terminal station 1 includes an antenna 11, a wireless communication portion 12, a control portion 13, a control signal encoding portion 14 and an encoding information receiving portion 15.

The wireless communication portion 12 receives wireless signals from the base station via the antenna 11. In addition, the wireless communication portion 12 transmits wireless signals to the base station via the antenna 11. The control portion 13 transmits/receives control signals to/from the base station via the wireless communication portion 12. The control signal encoding portion 14 receives a control signal of an upstream link which is used for a transmission to the base station and conducts an encoding operation on the received control signal. The control signal encoding portion 14 outputs the control signal after encoding (encoded control signal) to the wireless communication portion 12. The wireless communication portion 12 inputs the encoded control signal and transmits the encoded control signal to the base station via the antenna 11.

The encoding information receiving portion 15 receive encoding information from the base station via the wireless communication portion 12. The encoding information receiving portion 15 outputs the received encoding information to the control signal encoding portion 14. Based on the encoding information received from the encoding information receiving portion 15, the control signal encoding portion 14 obtains a code used for encoding the control signal.

Figure 2:
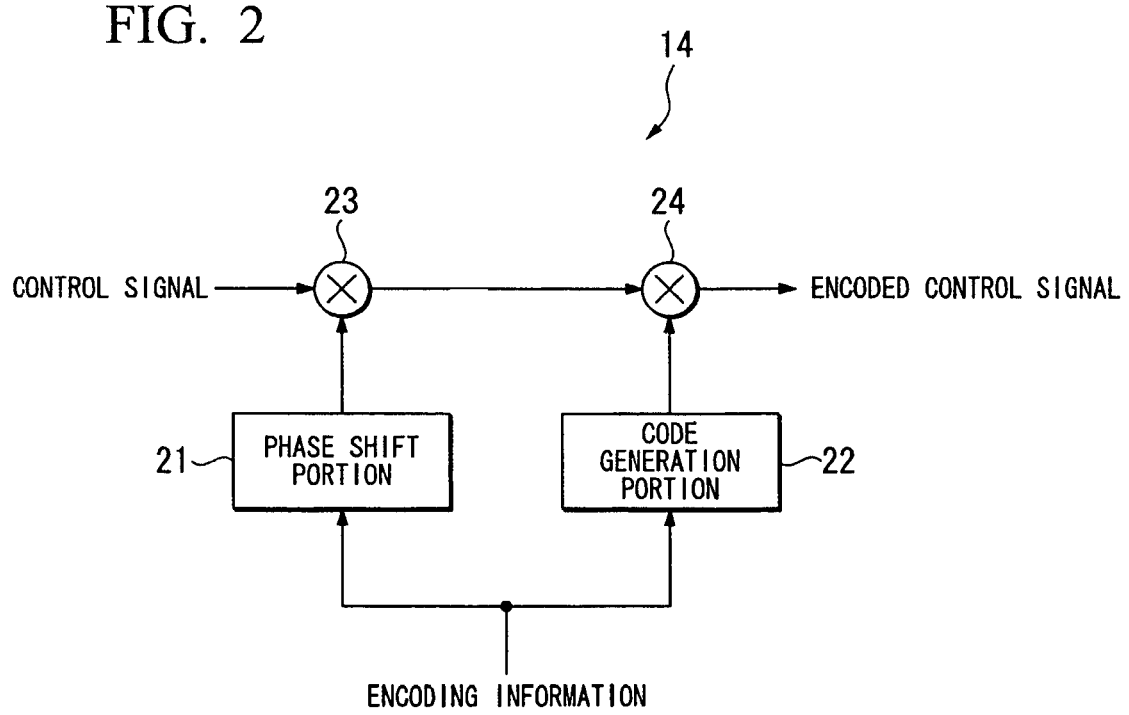
FIG. 2 is a block diagram showing a constitution of a control signal encoding portion 14 shown in FIG. 1.

FIG. 2 is a block diagram showing a constitution of the control signal encoding portion 14 shown in FIG. 1. In FIG. 2, the control signal encoding portion 14 includes a phase shift portion 21, a code generation portion 22, and multipliers 23 and 24.

Based on the encoding information received from the encoding information receiving portion 15, the phase shift portion 21 conducts a phase shift operation on a first code. The phase shift portion 21 outputs the first code to the multiplier 23 after the phase shift operation. The encoding information output from the encoding information receiving portion 15 includes information that indicates amount of a phase shift with regard to the first code. The first code has a constant amplitude and a zero autocorrelation. It is possible to use, for example, CAZAC code as the first code.

The code generation portion 22 generates a second code based on the encoding information input from the encoding information input from the encoding information receiving portion 15. The second code is generated after selecting one of multiple codes that are orthogonally crossing each other. The encoding information received from the encoding information receiving portion 15 includes information for determining the second code. It is possible to use, for example, Walsh codes as the orthogonally crossing codes.

It should be noted that it is possible to directly include the second code in the encoding information received from the encoding information receiving portion 15. In other words, the code generation portion 22 can be a code selection unit that provides a function of selecting the second code from the codes which orthogonally cross each other, based on the encoding information input from the encoding information receiving portion 15.

In the control signal encoding portion 14 shown in FIG. 2, the multiplier 23 which is firstly provided conducts a multiplication operation between the control signal input from the control portion 13 and the code (the first code after phase shift operation) output from the phase shift portion 21. In a following step, the multiplier 24 which is secondary provided conducts a multiplication operation between a signal output from the multiplier 23 and the code (second code) output from the code generation portion 22. In accordance with such an operation, the control signal output from the control portion 13 is converted to the encoded control signal which is encoded by using both the first code after phase-shifting and the second code. The multiplier 24 outputs the encoded control signal to the wireless communication portion 12.

Figure 3:
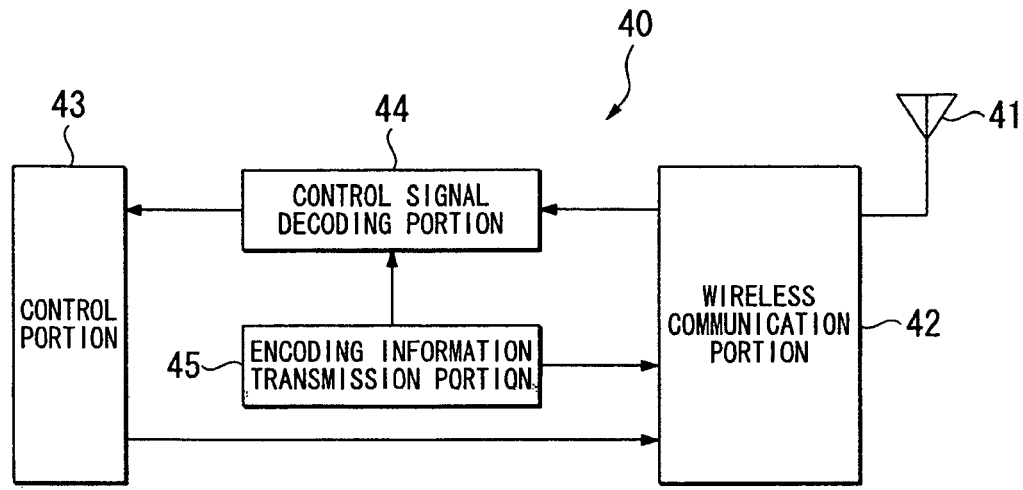
FIG. 3 is a block diagram showing a constitution of a base station (wireless base station apparatus) 40 of one embodiment of the present invention.

FIG. 3 is a block diagram showing a constitution of a base station (wireless base station apparatus) 40 of one embodiment of the present invention. The base station 40 shown in FIG. 3 is a base station of the mobile communication system and conducts a wireless communication to the terminal station 1 shown in FIG. 1. In FIG. 3, the base station 40 includes an antenna 41, a wireless communication portion 42, a control portion 43, a control signal decoding portion 44 and an encoding information transmission portion 45.

The wireless communication portion 42 receives wireless signals from the terminal station 1 via the antenna 41. In addition, the wireless portion 42 transmits wireless signals to the terminal station via the antenna 41. The control portion 43 transmits/receives control signals to/from the terminal station 1 via the wireless communication portion 42. The control signal decoding portion 44 receives the encoded control signal transmitted from the terminal station 1 via the wireless communication portion 42 and decodes the encoded control signal after receiving. The control signal decoding portion 44 outputs the decoded control signal to the control portion 43.

Via the wireless communication portion 42, the encoding information transmission portion 45 transmits the encoding information which is different with regard to each of the terminal stations. In addition, the encoding information transmission portion 45 outputs the encoding information corresponding to each of the terminal stations to the control signal decoding portion 44. Based on the encoding information input from the encoding information transmission portion 45, the control signal decoding portion 44 obtains the code which is used to decode the encoded control signal.

The control signal decoding portion 44 conducts a decoding operation which corresponds to the encoding operation by the control signal encoding portion 14 shown in FIG. 2. The control signal decoding portion 44 provides a phase shifting portion which conducts a phase shifting operation on the first code based on the encoding information which is provided in correspondence with each of the terminal stations. The phase shifting operation on the first code in correspondence with each of the terminal stations is conducted. The encoding information corresponding to each of the terminal stations includes information of amount of phase-shift of the corresponding terminal station. The first code is a code which has both a constant amplitude and a zero autocorrelation, and the first code is common between the terminal stations.

In addition, based on the encoding information corresponding to each of the terminal stations, the control signal decoding portion 44 provides a code selection portion which selects the second code from the codes which orthogonally cross each other. With regard to each of the terminal stations, as the second code, one code is selected between the codes which orthogonally cross each other. The codes which orthogonally cross each other and form which the second code is selected are common among the terminal stations. The encoding information corresponding to each of the terminal stations includes information which specifies the second code of the corresponding terminal station.

In addition, the control signal decoding portion 44 provides a decoding portion which decodes the encoded control signal by using both the first code after phase-shifting and the second code. Therefore, the encoded control signal transmitted from each of the terminal stations is decoded. The control signal after decoding is output to the control portion 43.

In a following explanation, examples of the first code and second code of this embodiment are shown and explained. Here, CAZAC code is used as the first code, and Walsh codes are used as "the codes which orthogonally cross each other" from which the second code is selected.

EXAMPLE 1

Figure 4:
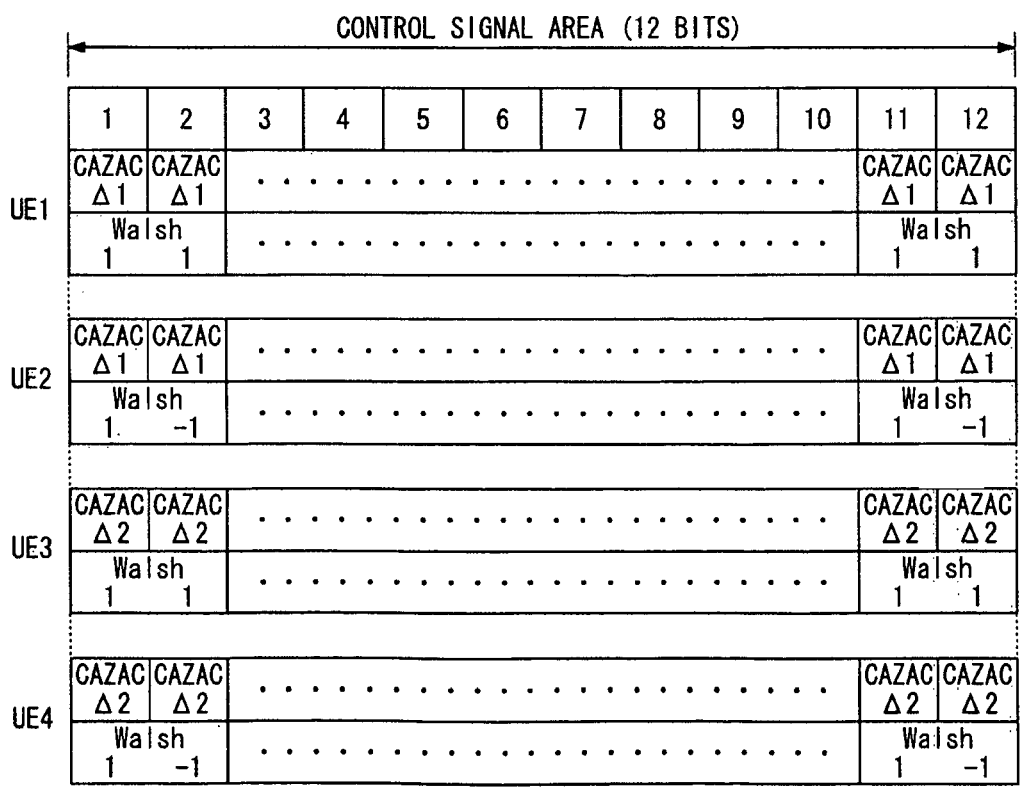
FIG. 4 is a drawing for explaining Example 1 in which a first code and a second code of the present invention are used.

FIG. 4 is a drawing for explaining Example 1 in which the first code and the second code of this example are used. In the Example 1, a pair of Walsh codes of two dimensions "(1,1) and (1,−1)" are used. In FIG. 4, a control signal area has a 12 bit length, and the encoding operation is conducted on data stored in this 12 bit area. In an example shown in FIG. 4, each of four terminal stations 1 ("UE1", "UE2", "UE3" and "UE4") transmits a control signal of an uplink to the base station 40 which is a single base station.

As shown in FIG. 4, both "UE1" and "UE2" conducts an encoding operation on the control information by using CAZAC codes obtained by a phase-shifting of amount of Δ1. In addition, "UE1" conducts the encoding operation on the control information by using Walsh code of (1, 1), and "UE2" conducts the encoding operation on the control information by using Walsh code of (1, −1). In accordance with such a manner, even when both of CAZAC codes have the same amount of phase-shifting, it is possible to conduct encoding operations on the control information of uplink so as to be orthogonal with regard to each of "UE1" and "UE2" because different Walsh codes are used. Therefore, it is possible to assign a pair of terminal stations to a single phase-shifting amount of Δ1.

In a similar manner, both "UE3" and "UE4" conducts an encoding operation on the control information by using CAZAC codes obtained by a phase-shifting of amount of Δ2, but different Walsh codes are used. "UE3" uses Walsh code of (1, 1), and "UE4" uses Walsh code of (1, −1). Therefore, it is possible to assign a pair of terminal stations to a single phase-shifting amount of Δ2.

In accordance with the Example 1, it is possible to assign a pair of terminal stations to a single phase-shifting amount applied to the CAZAC code. Therefore, compared to a prior art in which CAZAC code with an unique phase-shifting amount is assigned to each of terminal stations, it is possible to increase a number of terminal stations to be double while different codes are respectively assigned to the terminal stations.

EXAMPLE 2

FIG. 5 is a drawing for explaining Example 2 in which a first code and a second code are used. In the Example 2, Walsh codes of four dimensions "(1, 1, 1, 1), (1, −1, 1, −1), (1, 1, −1, −1), (1, −1, −1, 1)" are used. In an example shown in FIG. 5, in the similar manner as shown in FIG. 4, an encoding operation is conducted on a control signal area of 12 bits. In the similar manner as shown in FIG. 4, each of four terminal stations 1 ("UE1", "UE2", "UE3" and "UE4") transmits a control signal of an uplink to the base station 40 which is a single base station.

As shown in FIG. 5, by using the CZAC codes obtained by phase-shifting with a phase-shifting amount of Δ1, all of "UE1", "UE2", "UE3" and "UE4" conducts an encryption operation on the control information. It should be noted that each of these terminal stations, by using respectively different Walsh code, conducts the encryption operation on the control information. "UE1" uses Walsh code of (1, 1, 1, 1), "UE2" uses Walsh code of (1, −1, 1, −1), "UE3" uses Walsh code of (1, 1, −1, −1), and "UE4" uses Walsh code of (1, −1, −1, 1). Therefore, it is possible to assign four terminal stations even though the amount of phase-shifting is a single value, Δ1.

In accordance with Example 2, it is possible to assign four terminal stations to a single phase-shifting amount applied to the CAZAC code. Therefore, compared to a prior art in which CAZAC code with an unique phase-shifting amount is assigned to each of terminal stations, it is possible to increase a number of terminal stations to be four times while different codes are respectively assigned to the terminal stations.

EXAMPLE 3

FIG. 6 is a drawing for explaining Example 3 in which a first code and a second code are used. In the Example 3, in a similar manner as explained in Example 1, a pair of Walsh codes of two dimensions "(1,1) and (1,−1)" are used. In addition, in a similar manner as explained in Example 1, the encoding operation is conducted on data stored in a control signal area which has a 12 bit length. It should be noted that the encoding operation on Walsh codes is conducted only on a predetermined bit position included in the control signal area of 12 bits. In other words, the encoding operation on Walsh codes is not necessary that is conducted on all bit positions included in the control signal area. In accordance with Example 3, similarly as described in Example 1, it is possible to assign a pair of terminal stations to a single phase-shifting amount applied to the CAZAC code. Therefore, compared to a prior art in which CAZAC code with an unique phase-shifting amount is assigned to each of terminal stations, it is possible to increase a number of terminal stations to be double while different codes are respectively assigned to the terminal stations.

As described above, in accordance with this embodiment, compared to a prior art in which CAZAC code with a unique phase-shifting amount is assigned to each of terminal stations, it is possible to increase a number of terminal stations while different codes are respectively assigned to the terminal stations. As a result, it is possible to provide an advantage in which it is possible to increase a number of terminal stations that are covered by a single base station.

It should be noted that, in the above-described Examples 1-3, Walsh codes are used as "the codes which orthogonally cross each other" from which the second code is selected. However, Walsh codes are not a limitation for "the codes which orthogonally cross each other".

For example, it is possible to use orthogonal codes generated from complex numbers as "the codes which orthogonally cross each other". Following example shows orthogonal codes of a three dimension generated from complex numbers.

$(1,1,1)$ $(1, e^{j2\pi/3}, e^{-j2\pi/3})$ $(1, e^{j4\pi/3}, e^{-j4\pi/3})$

In addition, it is possible to use orthogonal codes on a rotating coordinate system as "the codes which orthogonally cross each other". Following example is orthogonal codes on a rotating coordinate system of two dimensions.

$(\cos \theta, \sin \theta)$ $(-\sin \theta, \cos \theta)$

It should be noted that $\theta$ is a rotation angle.

When orthogonal codes on a rotating coordinate system are used, by adjusting the rotation angle $\theta$, it is possible to adjust or lower detection errors due to differences between reception levels of symbols.

In reference to the drawings, embodiments of the present invention are explained above. It should be noted that a concrete constitution is not limited by the above-described embodiments, and it is possible to include modifications of the constitution if the modifications is not out of a scope of the present invention.

For example, it is possible to conduct a modulation operation on the control signal. For example, it is possible to apply a modulation of QPSK (Quadrature Phase Shift Keying, Quadri-Phase Shift Keying) to CQI signal of 5 bits. In such a case, 2 bits can be transmitted per one symbol, and hence, it is possible to increase amount of information of a control storage area, and it is possible to achieve a higher communication quality of control signals.

INDUSTRIAL APPLICABILITY

In accordance with the above-described examples, in an operation of encoding the control signals of the upstream link transmitted from the multiple terminal stations while encoding with regard to each of the terminal stations, it is possible to increase a number of the terminal stations to which different codes are respectively assigned.

The invention claimed is:

1. A wireless terminal apparatus which encodes and transmits a control signal to a wireless base station apparatus, comprising:
   a receiver that receives encoding information which is used at the wireless terminal apparatus and which is transmitted from the wireless base station apparatus, and outputting the encoding information to an encoder;
   the encoder, which inputs the encoding information, comprising a first code, a second code, and a phase shift amount from the receiver, which conducts an encoding operation on the control signal using a first multiplier and a second multiplier,
      wherein the first multiplier conducts a multiplication operation using the first code on which a phase-shift operation is conducted by a phase shift portion using the phase-shift amount, and
      wherein the second multiplier conducts a multiplication operation using the second code, and which outputs the encoded control signal to a transmitter; and
   the transmitter that transmits the encoded control signal,
   wherein the second code includes $(1, e^{j4\pi/3}, e^{-j4\pi/3})$.

* * * * *